United States Patent [19]

Sharangpani et al.

[11] Patent Number: 5,357,455
[45] Date of Patent: Oct. 18, 1994

[54] FLOATING POINT REMAINDER GENERATOR FOR A MATH PROCESSOR

[75] Inventors: Harshvardhan Sharangpani, Santa Clara; Luke Girard, San Jose, both of Calif.

[73] Assignee: Intel Corporation, Santa Clara, Calif.

[21] Appl. No.: 959,063

[22] Filed: Oct. 9, 1992

[51] Int. Cl.⁵ ............................................. G06F 7/50
[52] U.S. Cl. ................................ 364/767; 364/748
[58] Field of Search ............................... 364/748, 767

[56] References Cited

U.S. PATENT DOCUMENTS

| | | | |
|---|---|---|---|
| 4,939,686 | 7/1990 | Fandrianto | 364/767 |
| 4,979,142 | 12/1990 | Allen et al. | 364/767 |
| 5,128,891 | 7/1992 | Lynch et al. | 364/767 |

OTHER PUBLICATIONS

Algorithm for High Speed Shared Radix 4 Division and Radix 4 Squre-Root, J. Fandrianto, 1987, IEEE.

*Primary Examiner*—David H. Malzahn
*Attorney, Agent, or Firm*—Blakely, Sokoloff, Taylor & Zafman

[57] ABSTRACT

A hardware floating point remainder generator is disclosed for performing a remainder (REM) function by receiving two floating point numbers (X and Y), by generating the remainder of X/Y according to a series of radix 4 SRT non-restoring division cycles and at most one single bit restoring division step, and by delivering the remainder.

25 Claims, 7 Drawing Sheets

FLOATING POINT REMAINDER GENERATOR FOR A MATH PROCESSOR

BACKGROUND OF THE INVENTION

1. Field of the Invention

This invention relates to the field of floating point math processors in computer systems. More particularly, this invention relates to floating point remainder generators in math processors.

2. Art Background

A common method of improving speed of a computer system is to employ a math processor for performing mathematical calculations. The combination of a processor and the math processor provides greatly increased speed of system operation, since math processors are optimized for performing mathematical calculations, and since the burden of performing specialized calculations is lifted from the processor. Tasks typically delegated to a math processor include floating point addition, subtraction, multiplication and division.

A useful function for hardware implementation in a math processor is the floating point remainder (REM) function. The REM function requires a math processor to divide a floating point number "X" by another floating point number "Y" to generate an integer quotient, and deliver the remainder corresponding to the quotient. The REM function improves system accuracy, and is particularly useful in argument reduction for periodic functions like sin and cos, as well as table driven methods for computing functions such as arctan. The REM function provides higher precision for many other functions since the remainder delivered is always exact. In addition, the REM function is useful in cryptography and password recognition.

Previous math processors used single digit (1 bit of quotient per clock radix 2) restoring or non-restoring division steps to generate the REM function. However, this method is time-consuming since the number of division steps required roughly equals the difference between the floating point exponent values of X and Y.

As will be disclosed, the present invention provides a method and apparatus for improving the speed of the REM function by implementing a radix 4 SRT non-restoring method of division (which yields twice as many digits per divide step as radix 2 non restoring division), terminating with at most one single bit restoring division step.

SUMMARY OF THE INVENTION

A hardware floating point remainder generator is disclosed that implements the REM function by receiving two floating point numbers (X and Y), by generating the remainder of X/Y using radix 4 SRT non-restoring division steps followed by a single bit restoring division step, and by delivering the remainder. The remainder generator hardware is comprised of a control circuit, a partial remainder generator circuit, a quotient prediction circuit, a quotient generator circuit, and an exponent difference circuit.

The exponent difference circuit receives the exponent fields of floating point numbers X and Y, subtracts the exponent of Y from the exponent of X, and delivers the result to the control circuit. The control circuit first determines an iteration count (IC) for the series of radix 4 SRT non restoring division steps. The control circuit then generates control signals that control data flow through the quotient prediction circuit, the quotient generator circuit, and the partial remainder generator circuit, in order to perform the REM function.

To generate the REM function, the floating point remainder generator proceeds by iteratively performing radix-4 SRT non-restoring division steps. For each iteration of radix 4 SRT division, the quotient prediction circuit generates two bits of the quotient, which are transmitted to the partial remainder generator circuit, and to the quotient generator circuit. The partial remainder generator circuit receives on the first step the significand field of floating point number X, and the significand field of floating point number Y, and iteratively generates a partial remainder for SRT radix 4 non-restoring division using a multiplier circuit and a carry save adder.

After completing the radix 4 SRT non restoring division steps, the floating point remainder generator determines whether an additional quotient bit must be generated for the REM function. If so, the partial remainder generator circuit generates a partial remainder using single digit restoring division. The quotient is corrected to the desired integer value and the partial remainder is restored to correspond to the quotient. The quotient generator circuit then converts both the final quotient and the final remainder into non redundant form. The final remainder is then delivered along with a preselected portion of the final quotient.

DETAILED DESCRIPTION OF THE INVENTION

A hardware floating point remainder generator is disclosed that implements the REM function by receiving two floating point numbers from a processor, generating the remainder using radix 4 SRT non-restoring division steps and a single bit restoring division step, and delivering the remainder to the processor. In the following description, for purposes of explanation, specific circuit devices, circuit architecture's, and components are set forth in order to provide a more thorough understanding of the present invention. However, it will be apparent to one skilled in the art that the present invention may be practiced without these specific details. In other instances, well known circuits and devices are shown in schematic form in order not to obscure the present invention unnecessarily.

Figure 1:
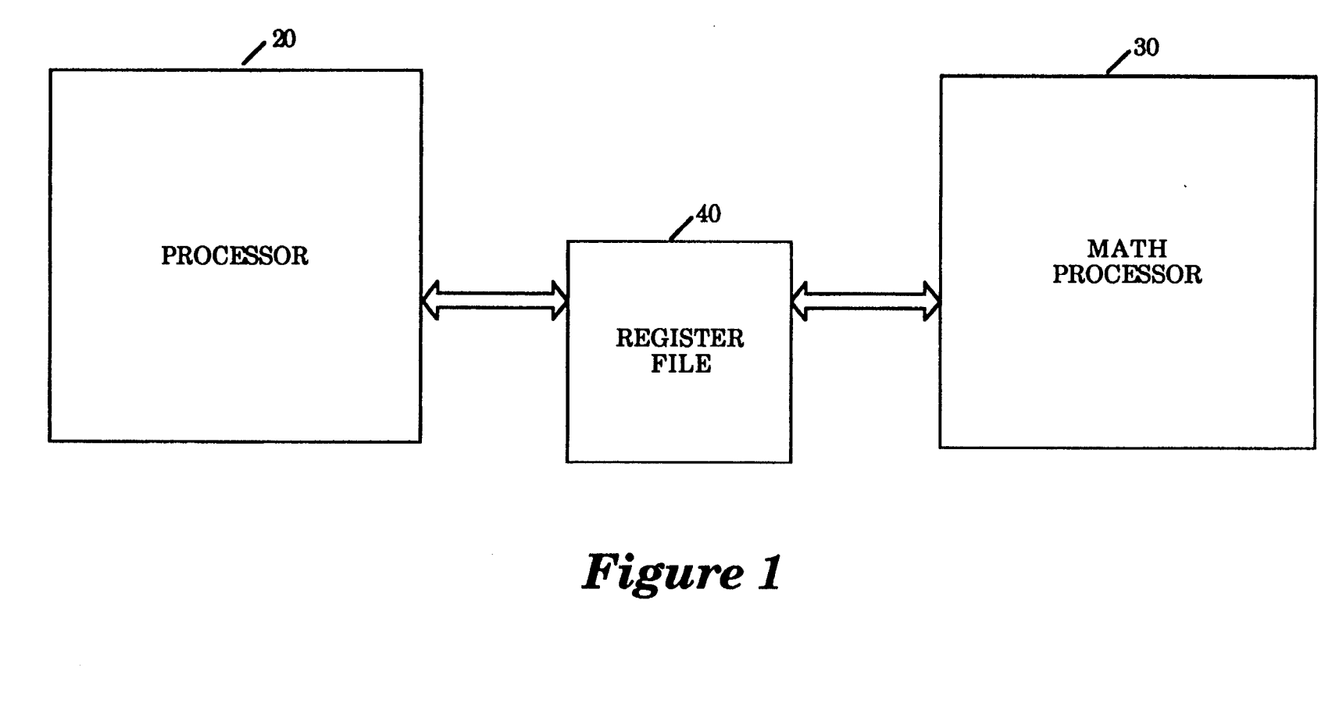
FIG. 1 is a block diagram of a computer system, which illustrates communication between a processor and a math processor.

Referring now to FIG. 1, an example computer system employing the teachings of the present invention is illustrated. A processor 20 and a math processor 30 are shown coupled to transfer information through a register file 40. In this example, the processor 20 transfers math instructions and arguments to the register file 40. The math processor 30 receives the math instructions and arguments from the register file 40, and thereafter delivers the results of math operations to the register file 40.

To perform the REM function, a math processor 30 receives the REM instruction and arguments from the register file 40. The arguments for the REM instruction include two floating point numbers X and Y.

In floating point representation conforming to the IEEE 754 Floating-Point Standard, a computer word defining a number is divided into three fields, a sign field, an exponent field, and a fraction field. The sign field determines whether the number is positive or negative, the exponent field determines the range of the number, and the fraction field determines the fractional part of the number. In other words, if e is the value of the exponent field and f is the value of the fractional field, then the number being represented is $1.f \times 2^{e-bias}$, where bias is a fixed bias value added to ensure that the exponent field is never negative. The significand field represents the value 1.f. For a complete description of the encodings of floating point number formats, see *IEEE standard for binary floating-point arithmetic - 754*.

The IEEE floating point standard includes support for single, double, and double extended precision formats. For one embodiment, the remainder generator supports arguments that reside in the double extended precision format. The double extended precision format accommodates all numbers that can be represented by the single and double precision formats.

Figure 2:
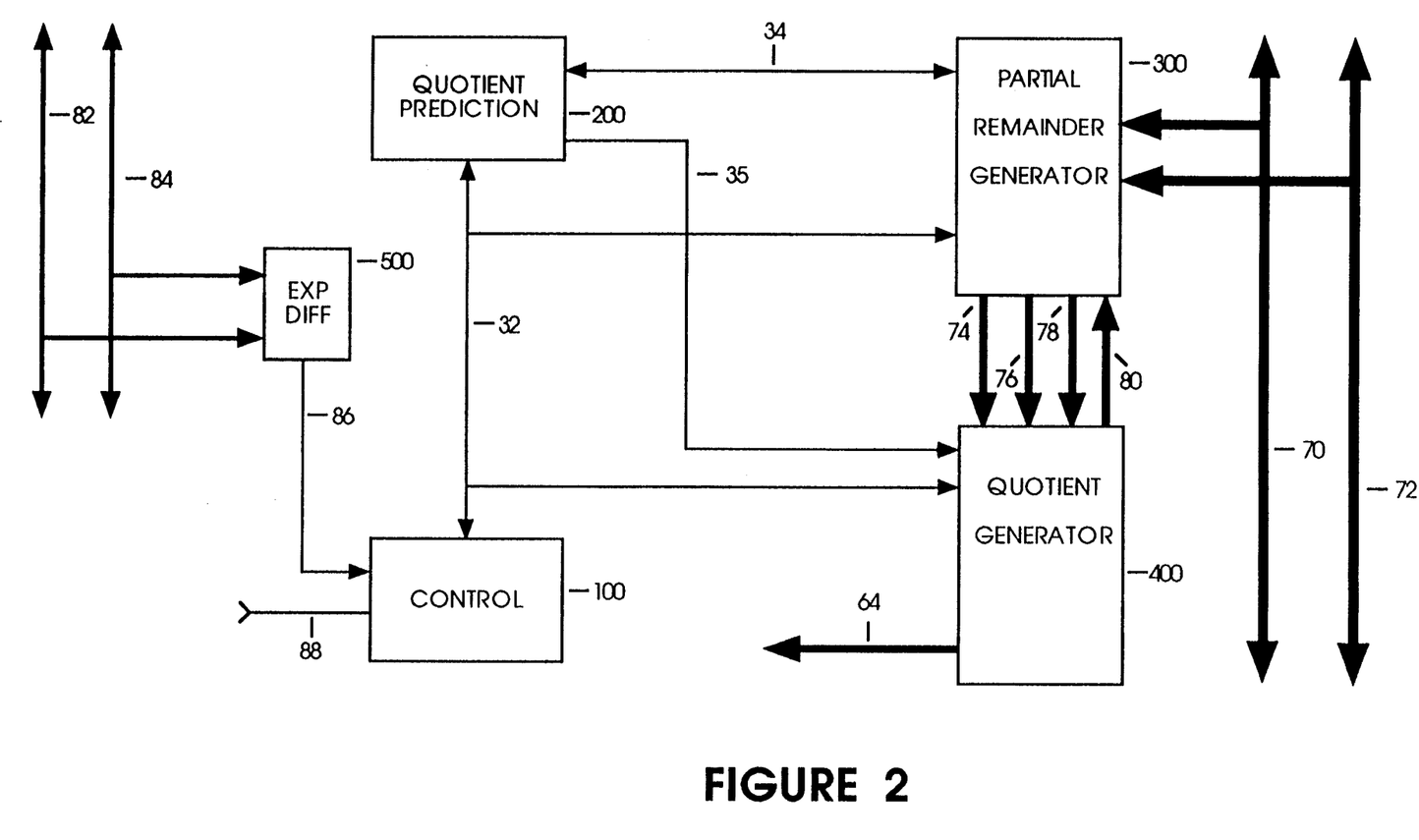
FIG. 2 is a block diagram of the REM function generator of the present invention, which is contained within the math processor.

FIG. 2 provides a functional block diagram of the floating point remainder generator of the present invention. The remainder generator is comprised of a control circuit 100, a quotient prediction circuit 200, a partial remainder generator circuit 300, a quotient generator circuit 400, and an exponent difference circuit 500. The exponent difference circuit 500 receives the exponent fields of floating point numbers X and Y over buses 82 and 84. The exponent difference circuit 500 subtracts the exponent of Y from the exponent of X, and delivers the result to the control circuit 100 over signal lines 86.

The control circuit 100 receives control signals 88 indicating that the REM function is being executed by math processor 30. The control circuit 100 receives exponent difference 86 and determines an iteration count (IC) for radix 4 SRT non restoring division. The control circuit 100 then generates control signals 32 in order to control the flow of data through the quotient prediction circuit 200, the partial remainder generator circuit 300, and the quotient generator circuit 400, while performing the REM function in accordance with the flow diagram shown in FIGS. 6a and 6b. A wide variety of state machine designs may be used to implement the function of control circuit 100, without departing from the spirit of the present invention. For one embodiment, control circuit 100 is comprised primarily of a programmable logic array with supporting circuitry.

To generate the REM function, the floating point remainder generator of the present invention begins by generating IC pairs of quotient bits using radix 4 SRT non restoring division. The basic SRT division algorithm involves generating solutions to the following recursive relationship.

$$P_{j+1} = (R \times P_j) - (Q_{j+1} \times D) \qquad \text{[Eq. 1]}$$

with the range restriction given by;

$$|P_{j+1}| <= N \times D/(R-1)$$

where
 $P_{j+1}$ = partial remainder in the j-th iteration
 R = radix
 $Q_j$ = quotient digit predicted in the j-th cycle
 D = divisor
 N = number of divisor multiples; i.e. (−2, −1, 0, 1, 2) for N=2.

Figure 6A:
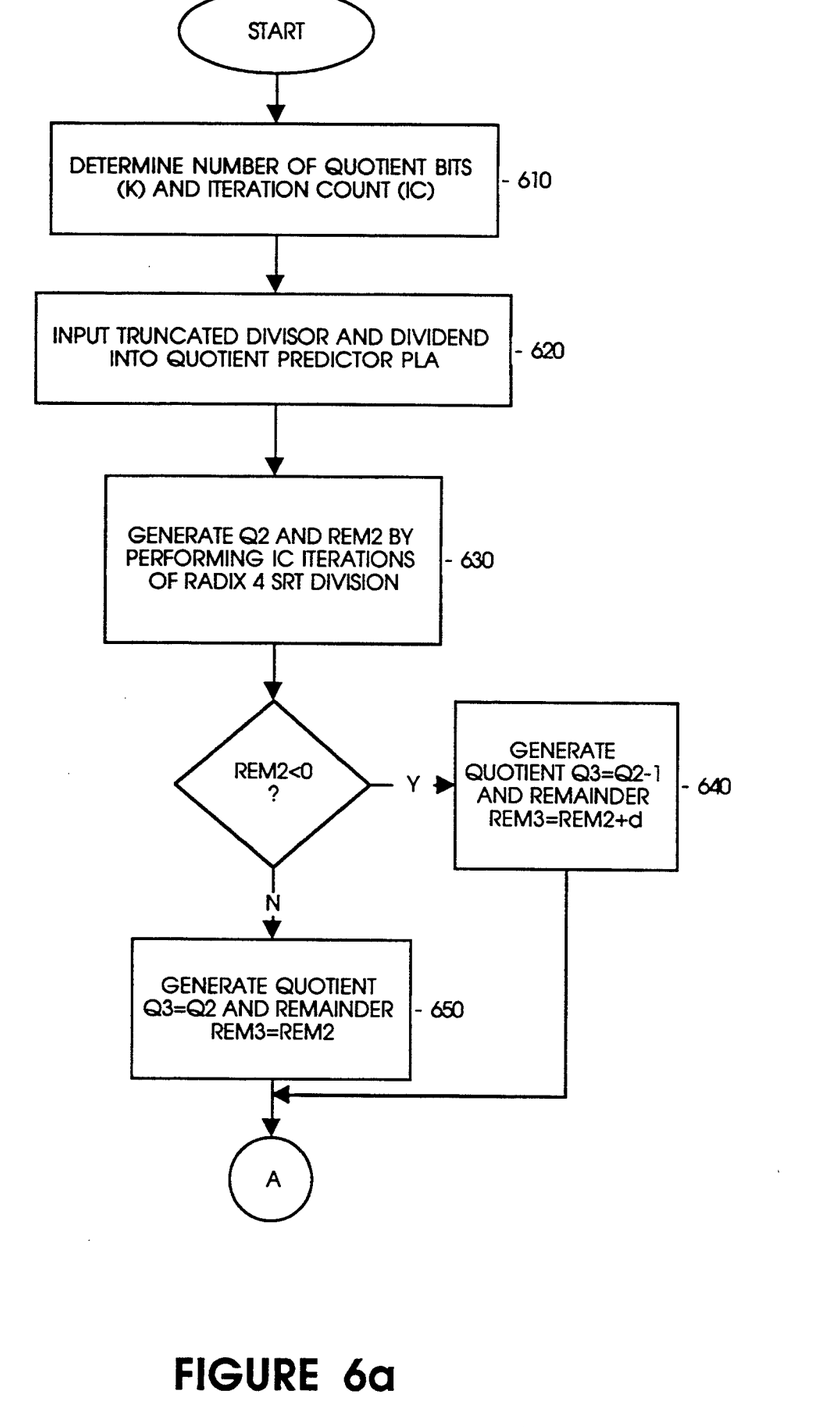
FIGS. 6a & 6b are a flow diagram of the method implemented by the floating point remainder generator of the present invention.
Figure 6B:
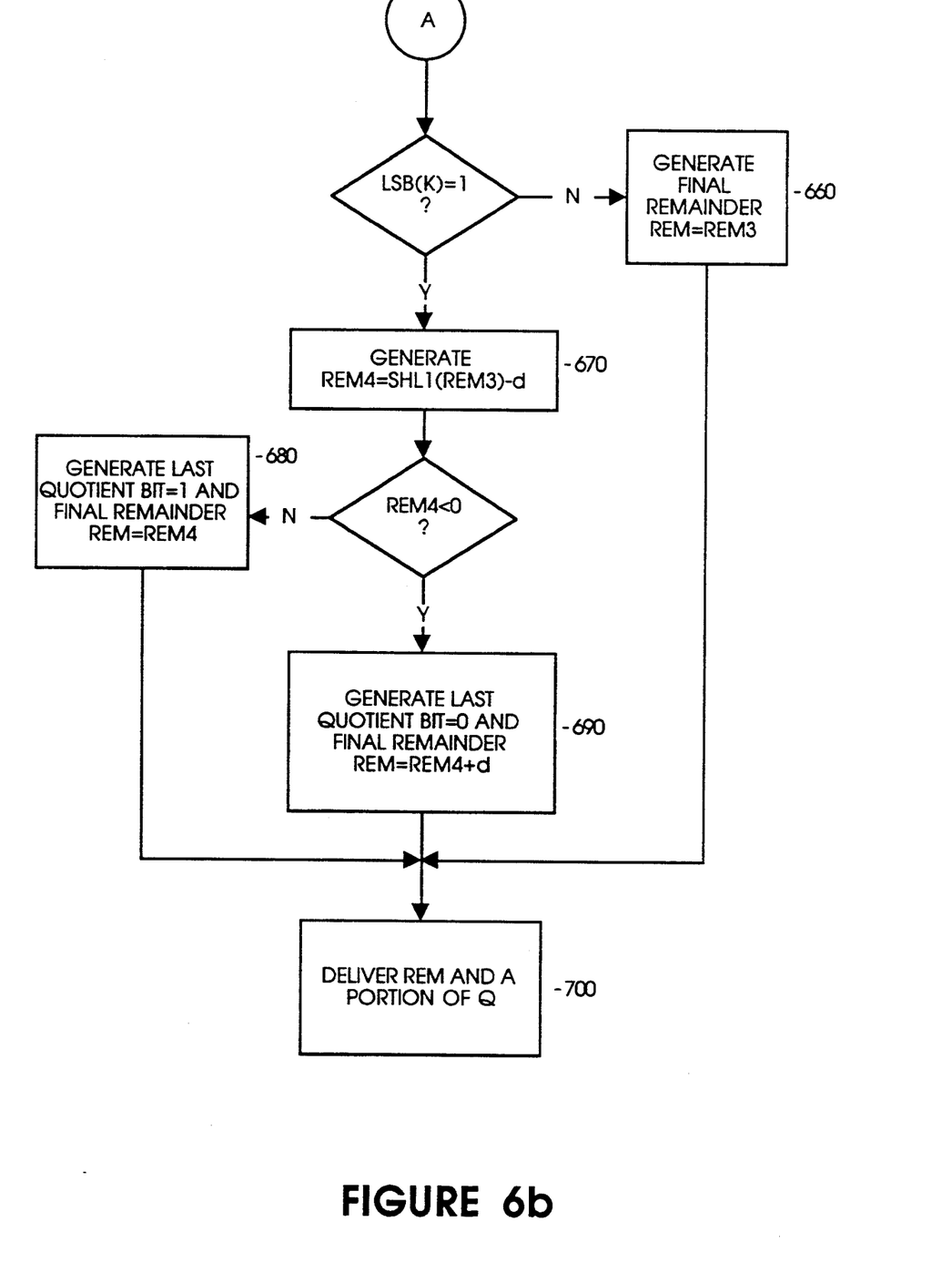

Before discussing the hardware implementation of the REM function in conjunction with the flow diagram of FIGS. 6a and 6b, a detailed description of the hardware is desirable.

Referring again to FIG. 2, quotient prediction circuit 200 predicts a next quotient value ($Q_{j+1}$) for SRT radix 4 non-restoring division. Quotient prediction circuit 200 receives information from partial remainder generator circuit 300 over signals lines 34. The next quotient is transmitted to partial remainder generator circuit 300 over signal lines 34, and transmitted in redundant form to quotient generator circuit 400 over signal lines 35.

Partial remainder generator circuit 300 receives the significand field of floating point number X over signal lines 70, and receives the significand field of floating point number Y over signal lines 72. Partial remainder generator circuit 300 iteratively generates a partial remainder $P_{j+1}$ for SRT radix 4 non-restoring division.

Quotient generator circuit 400 generates both the final quotient and the final remainder into non redundant form for delivery to processor 20 over signal lines 64. Quotient generator circuit 400 is needed since both the quotient and the partial remainder are generated in redundant form by partial remainder generator circuit 300 and quotient prediction circuit 200.

For one embodiment, the significand fields of floating point numbers X and Y received from processor 20 are 64 bits wide in order to accommodate double extended precision. However, the working precision of the current embodiment is 68 bits. Three of the extra bits are used for rounding, and one of the extra bits is used for overflow. The data path is 70 bits wide to allow for a sign bit in the larger negative forms of the term R * $P_j$.

Figure 3:
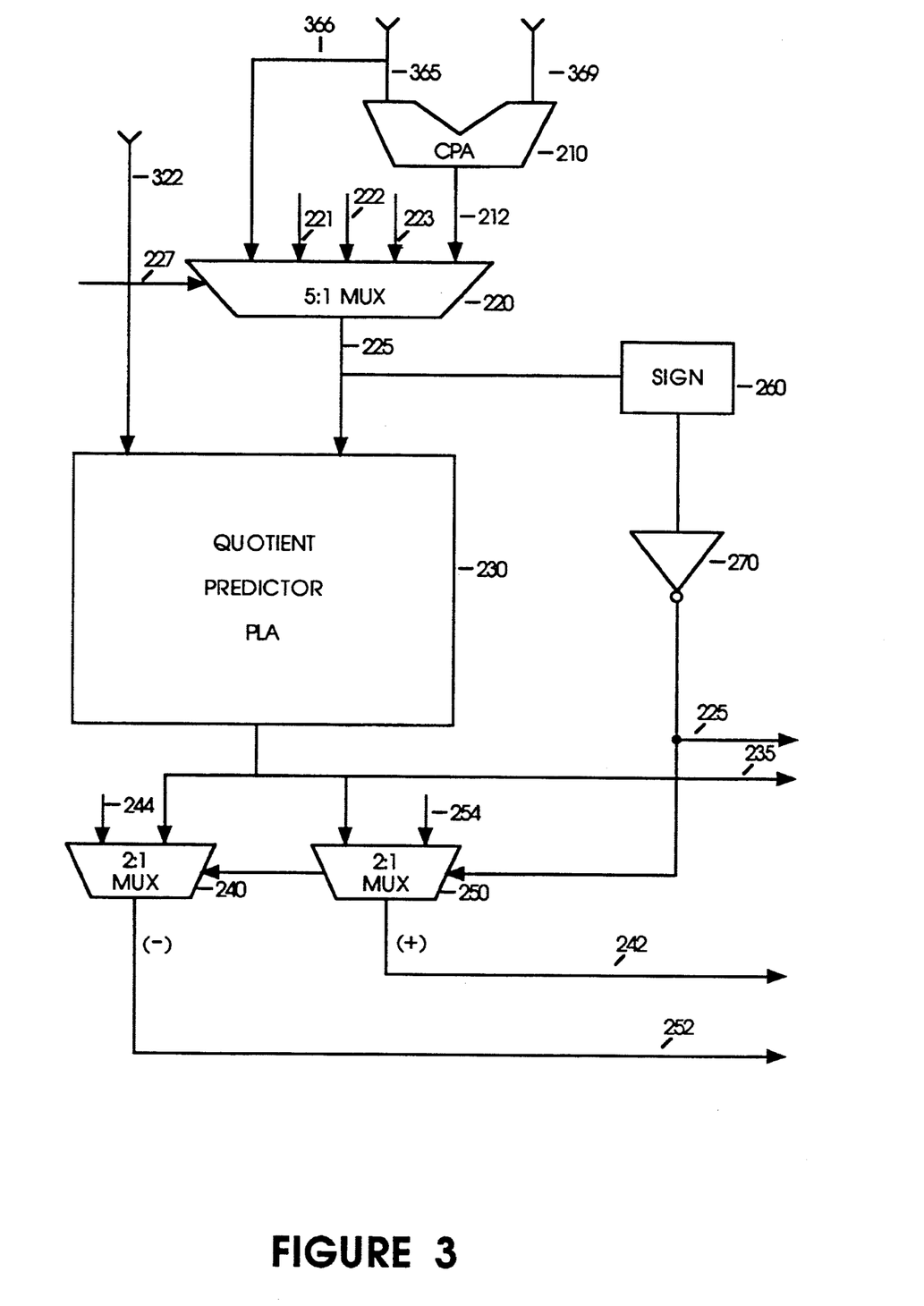
FIG. 3 is an illustration of the quotient prediction circuit, including the quotient predictor PLA, which is used to predict a next quotient for radix 4 SRT non-restoring division.

FIG. 3 provides a schematic illustration of quotient prediction circuit 200. Quotient predictor PLA 230 receives the most significant bits of the divisor from partial remainder generator circuit 300 over signal lines 322. Carry propagate adder (CPA) 210 receives a truncated portion of the redundant partial remainder from partial remainder generator 300 over signal lines 365 and 369. CPA 210 assembles the sum portion 365 and carry portion 369 of the truncated partial remainder into composite partial remainder 212, which is input to multiplexer 220.

Multiplexer 220 selectively couples composite partial remainder 212, preselected bits 366 of sum portion 365, and constant inputs 221 through 223, to the input of PLA 230 according to control signals 227 received from control circuit 100. Output 225 of multiplex 220 is coupled to an input of quotient predictor PLA 230. The most significant bit of output 225 is stored in sign register 260.

PLA 230 generates next quotient 235 which along with next quotient sign 225, as will be seen, is used for the radix 4 SRT divide step implemented by partial remainder generator circuit 300. Next quotient sign 225 is also used to selectively couple next quotient 235 to next positive quotient 242 and next negative quotient 252. Inputs 244 and 254 of multiplexers 240 and 250 each provide a constant zero input of 2 bits. Thus, it will be appreciated that if next quotient 235 is positive, next quotient sign 225 causes multiplexer 250 to couple next quotient 235 to next positive quotient 242, and causes multiplexer 240 to couple constant zero 244 to next negative quotient 252. On the other hand, if next quotient 235 is negative, next quotient sign 225 causes multiplexer 240 to couple next quotient 235 to next negative quotient 252, and causes multiplexer 250 to couple constant zero 254 to next positive quotient 242. As will be describe, next positive and next negative quotients 242 and 252 are used by quotient generator circuit 400 to generate a running quotient.

Quotient predictor PLA 230 generates next quotient values from the set [−2, −1, 0, 1, 2]. For more complete discussion of quotient predictor PLA 230 and associated circuitry, refer to related application Serial No. 07/938,003, filed on Aug. 31, 1992, and entitled Method & Apparatus for Overriding Quotient Prediction in Floating Point Divider Information Processing Systems.

Figure 4:
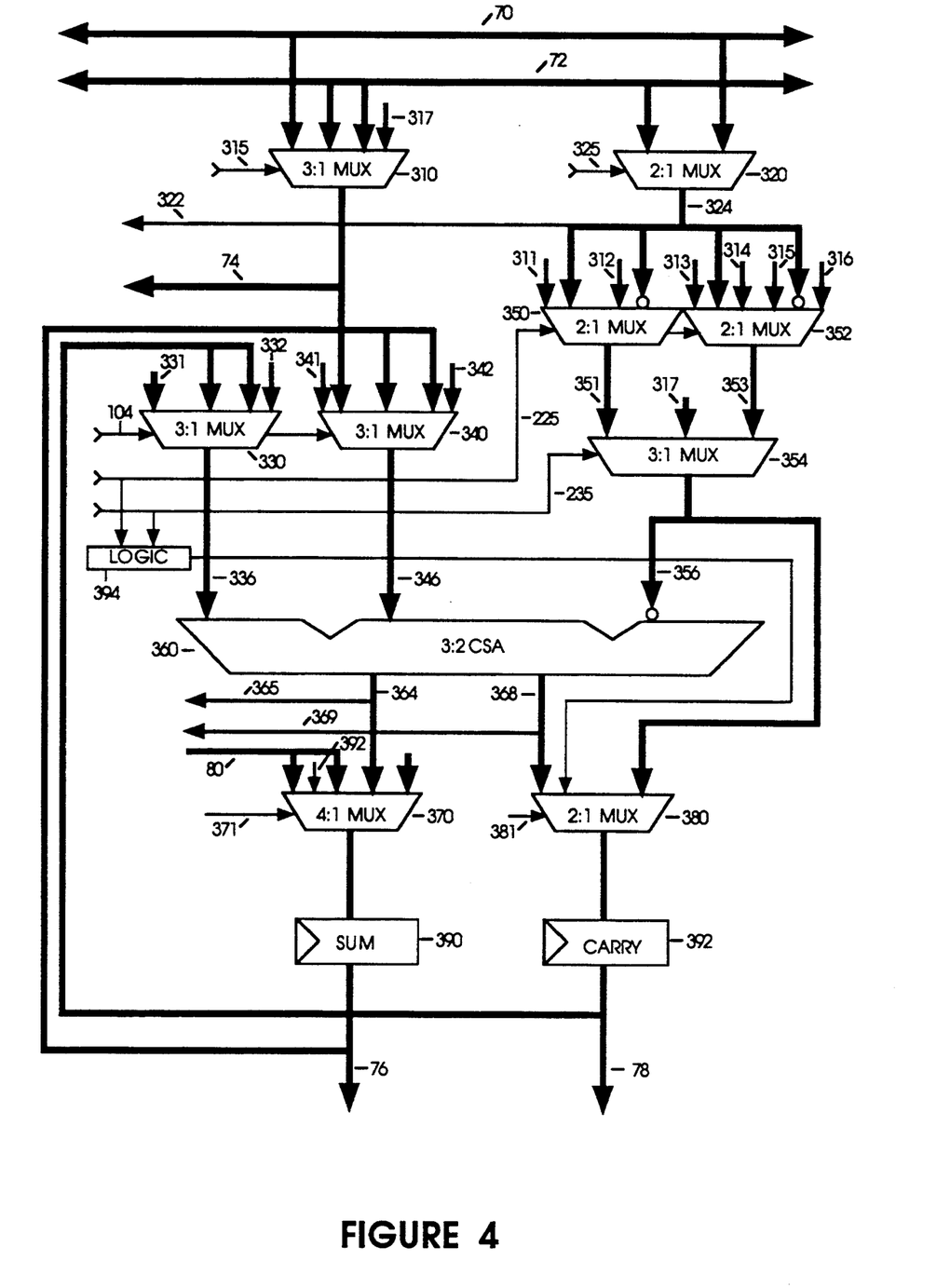
FIG. 4 is an illustration of the partial remainder generator circuit, which performs division steps for radix-4 SRT non-restoring division.

FIG. 4 illustrates partial remainder generator circuit 300, which iteratively generates a redundant partial remainder. The redundant partial remainder is stored in sum register 390 and carry register 392. Carry save adder (CSA) 360 iteratively generates a next partial remainder during radix 4 SRT non restoring division and single digit restoring division. For one embodiment, it is preferable that carry save adder be used for adder 360 in order to improve speed. Sum 76 and carry 78 are fed back to input 346 and input 336 of CSA 360 through multiplexers 340 and 330. Multiplexer 340 is also coupled to selectively transfer dividend 74 to CSA input 346.

Multiplexers 310 and 320 receive the significand fields of floating point numbers X and Y from processor 20 over busses 70 and 72. For one embodiment, either bus 70 or 72 may carry the significand of X, with the other carrying the significand of Y. Control signals 315 and 325 received from control circuit 100 cause multiplexers 310 and 320 to selectively couple the significand of X to dividend 74, and the significand of Y to divisor 324. For one embodiment, busses 70 and 72 are each 68 bits wide.

Multiplexers 350, 352 and 354 generate adder input 356 equal to next quotient 235 (received from quotient prediction circuit 200) times divisor 324. This is equivalent to the term $(Q_{j+1} \times D)$ of Eq. 1. The multiply function will be appreciated by examining the inputs to multiplexers 350 352, and 354. For one embodiment, multiplexers 350, 352, and 354 have 70 bit inputs and 70 bit outputs. Multiplexer 350 is a 2-to-1 multiplexer with the first input comprised of constant input 311 and divisor 324. Constant input 311 provides two bits of binary zero which are concatenated to the most significant bits of divisor 324, resulting in a combined multiplexer input equal to divisor 324 with two zeroes as the most significant bits. Thus, if the first input of multiplexer 350 is selected, output 351 of multiplexer 350 is equivalent to 1 times divisor 324. The second input of multiplexer 350 is comprised of divisor 324 and constant input 312, which provides two bits of constant binary 1. Input 312 is concatenated to the most significant bits of the ones' complement of divisor 324, resulting in a combined multiplexer input equal to the negative of divisor 324. Thus, if the second input of multiplexer 350 is selected, output 351 of multiplexer 350 is equivalent to −1 times divisor 324.

Multiplexer 352 is a 2-to-1 multiplexer with the first input comprised of constant input 313 (a one bit constant equal to zero), the upper 67 bits of divisor 324, and constant input 314 (a one bit constant equal to zero). This results in a combined multiplexer input equal to divisor 324 shifted left by one bit with a binary zero into the least significant bit. Thus, if the first input of multiplexer 352 is selected, output 353 is equivalent to 2 times divisor 324. Similarly, the second input of multiplexer 352 is comprised of constant input 315 (a one bit constant equal to one), the ones' complement of the upper 67 bits of divisor 324, and constant input 316 (a one bit constant equal to one). This results in a combined multiplexer input equal to the ones' complement of divisor 324 shifted left by one bit with a binary one into the least significant bit, and a binary one concatenated to the most significand bit. Thus, if the second input of multiplexer 352 is selected, output 353 is equivalent to −2 times divisor 324.

Next quotient sign 225, which is received from quotient prediction circuit 100, controls multiplexers 350 and 352. If next quotient sign 225 is positive, output 351 will carry "+1" times divisor 324 and output 353 will carry "+2" times divisor 324. On the other hand, if next quotient sign 225 is negative, output 351 will carry "−1" times divisor 324 and output 353 will carry "−2" times divisor 324. Multiplexer 354 receives outputs 351 and 353, along with constant input 317 which provides 70 bits of binary zero. Next quotient 235, received from quotient prediction circuit 100, causes multiplexer 354 to selectively couple either output signal 351, output signal 353, or constant input 317 to CSA input 356. If next quotient 235 equals zero, CSA input 356 is coupled to constant zero input 317. If next quotient 235 equals one, CSA input 356 is coupled to output 351, which is either +1 or −1 times divisor 324, depending on next quotient sign 225. Likewise, if next quotient 235 equals two, CSA input 356 is coupled to output 353, which is either +2 or −2 times divisor 324, depending on next quotient sign 225.

Thus, multiplexers 350, 352, and 354 multiply divisor 324 by the next quotient (reflected in next quotient 235 and next quotient sign 225) received from quotient prediction circuit 200. This multiplier circuit was implemented to meet the exigencies of integrated circuit topology and speed requirements. However, a wide variety of multiplier or shifting circuits may be employed to achieve the desired result within the framework of the present invention.

Figure 5:
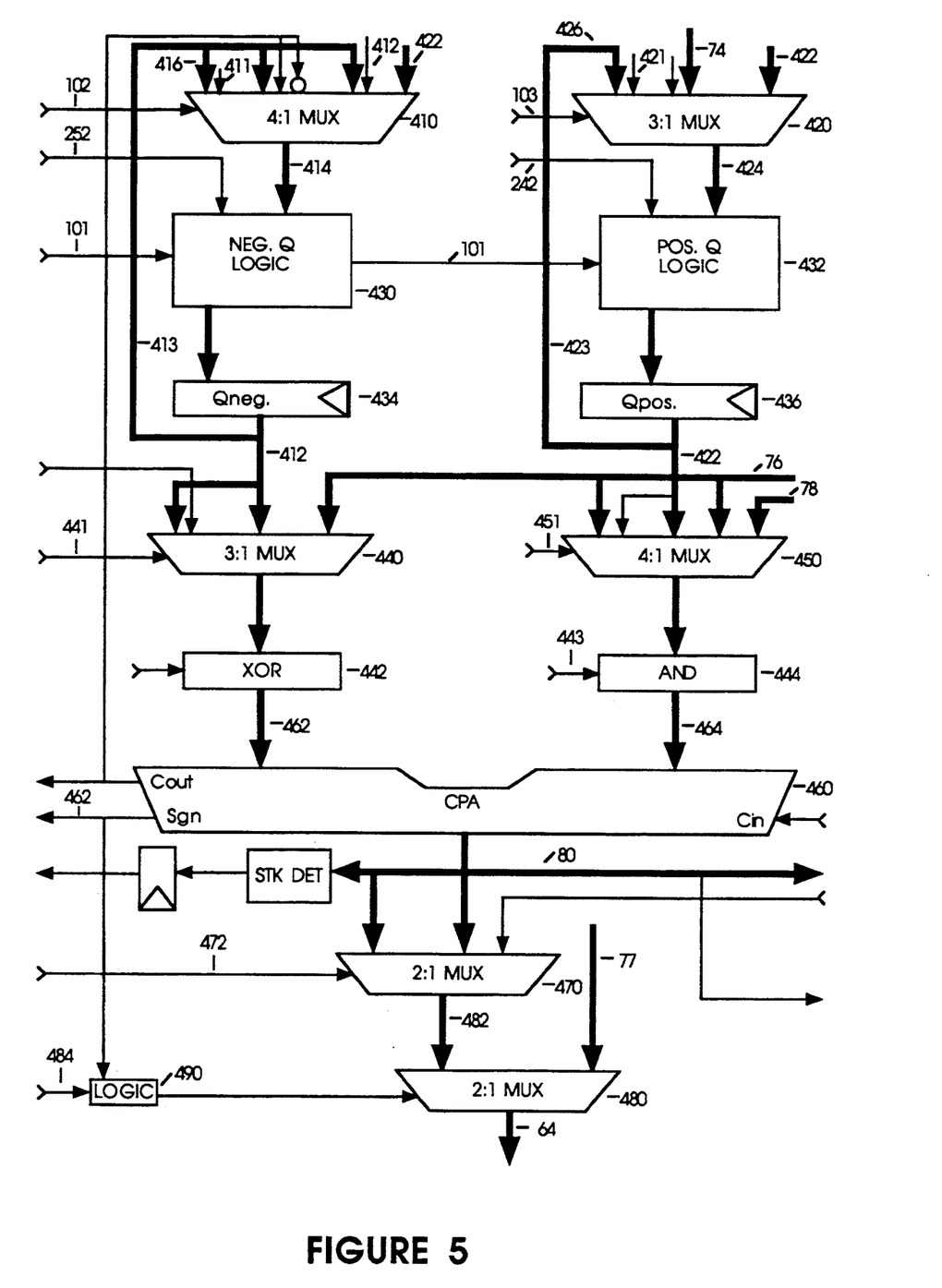
FIG. 5 is a schematic illustration of the quotient generator circuit, which is used to combine the redundant forms of the quotient and the partial remainder, and to perform the terminating single bit restoring division step.

FIG. 5 is a schematic illustration of quotient generator circuit 400, which stores a running quotient in redundant form comprising a negative portion in register 434, and a positive portion in register 436. Carry propagate adder (CPA) 460 adds negative quotient 434 and positive quotient 436, which are selectively coupled through multiplexers 440 and 450, to generate a final quotient. CPA 460 is also used to generate a final remainder by adding sum portion 76 and carry portion 78 of the redundant partial remainder, which are selectively coupled through multiplexers 440 and 450.

Negative quotient logic 430, in combination with multiplexer 410, merges next quotient 252 into the appropriate bits of negative quotient 434. Multiplexers 410 has 70 bit inputs and 70 bit outputs. Constant input 411 provides two bits of constant zero. Input 416 provides the lower 68 bits of negative quotient 434. Inputs 416 and 411, concatenated as the first input to multiplexer 410, are equivalent to negative quotient 434 shifted left by two bits. The first input of multiplexer 410 is selectively coupled to input 414 of negative quotient logic 430 according to control signals 102 received from control circuit 100. Negative quotient logic 430 also receives precision select signal 101 from control circuit 100. Based upon precision select 101, negative quotient logic 430 merges next negative quotient 252 into negative quotient 434. If precision select 101 indicates extended precision, negative quotient logic 430 merges next negative quotient 252 into bits 0 and 1 of negative quotient 434. If precision select 101 indicates double precision, negative quotient logic 430 merges next negative quotient 252 into bits 12 and 13 of negative quotient 434, and if precision select 101 indicates single precision, negative quotient logic 430 merges next negative quotient 252 into bits 40 and 41 of negative quotient 434.

In a similar manner, positive quotient logic 432 and multiplexer 420 merge next quotient 242 into the appropriate bits of positive quotient 436. Multiplexers 420 has 70 bit inputs and 70 bit outputs. Constant input 421 provides two bits of constant zero, which are concatenated to the lower 68 bits of positive quotient 436 to form the first input of multiplexer 420. The first input of multiplexer 420 is selectively coupled to input 424 of positive quotient logic 432 according to control signals 103 received from control circuit 100. Positive quotient logic 432 merges next positive quotient 242 into positive quotient 436 according to precision select 101 received from control circuit 100. If precision select 101 indicates extended precision, positive quotient logic 432 merges next positive quotient 242 into bits 0 and 1 of positive quotient 436. If precision select indicates double precision, positive quotient logic 432 merges next positive quotient 242 into bits 12 and 13 of positive quotient 436, and if precision select 101 indicates single precision, positive quotient logic 432 merges next positive quotient 242 into bits 40 and 41 of positive quotient 436.

FIG. 6a and 6b provide a flow diagram of the method for generating the REM function employed by the present invention. At block 610 the number of quotient bits (K+1) and the iteration count (IC) are determined. K is equal to the exponent field of X minus the exponent field of Y. IC is given by shr1 (K)+1, where "shr1" is the shift right by one logical function. Thus, IC is equal to the value [(NQ+1)/2] truncated to an integer.

To determine K and IC, exponent difference circuit 500 receives the exponent fields 82 and 84 of floating point numbers X and Y, subtracts exponent field 84 of Y from exponent field 82 of X, and transfers the result to control circuit 100 over signal lines 86. Control circuit 100 receives diff signal 86, performs the shr1 function, adds one, and stores the resulting IC. IC is used by control circuit 100 as an iteration count for generating IC pairs of quotient digits using radix 4 SRT division steps.

At block 620, the SRT hardware is initialized, and the truncated divisor and dividend are fed to the quotient predictor PLA. Negative and positive quotient registers 434 and 436 are initialized to zero when control circuit 100 issues controls signals 102 and 103 to select constant zero inputs 422, which pass through negative and positive quotient logic 430 and 432 through to registers 434 and 436. Sum register 390 and carry register 392 are initialized when control circuit 100 issues control signals 104, which causes multiplexer 330 to couple constant zero input 331 to CSA input 336, and causes multiplexer 340 to couple dividend 74 to CSA input 346. Moreover, next quotient 235, in its initial state, causes multiplexer 354 to couple constant zero input 317 to CSA input 356. Since the CSA inputs are zero, dividend 74, and zero, the initial partial remainder stored in sum register 390 and carry register 392 is equal to dividend 74.

For the first iteration cycle, control signals 227 cause multiplexer 220 to transfer truncated sum 366 to PLA input 225. The truncated sum 366 comprises bits 63 to 69 of the truncated partial remainder sum 365.

For subsequent iteration cycles, truncated partial remainder sum 365 and truncated partial remainder carry 369 are added by CPA 210, which generates input 212 for multiplexer 220.

Control circuit 100 issues control signals 227 to cause multiplexer 220 to transfer truncated partial remainder 212 to PLA input 225. Since the partial remainder is initially set to dividend 74, as discussed above, PLA input 225 is initialized equal to the truncated dividend 74. Quotient predictor PLA 230 also receives truncated divisor 322.

For one embodiment, for iteration cycles subsequent to the first iteration cycle, the truncated partial remainder sum 365 comprises bits 61 through 67 of partial remainder sum 390, and truncated partial remainder carry 369 comprises bits 61 through 67 of partial remainder carry 392.

For all cycles, the truncated divisor 322 comprises bits 62 through 65 of divisor 324.

At block 630, Q2 and REM2 are generated by performing IC iterations of radix 4 SRT division, which involves generating IC solutions to Eq. 1. For each iterative solution of Eq. 1, multiplexers 350, 352 and 354 generate CSA input 356 to CSA 360 to equal the next quotient (reflected in next quotient 235 and next quotient sign 225) times divisor 324. Sum and carry portions 76 and 78 of the partial remainder are fed back through to CSA inputs 336 and 346 for a subsequent iteration. It will be appreciated that CSA 360 generates each next partial remainder equal to (the previous partial remainder times the Radix) plus (the next quotient times the divisor) as given by Eq. 1. For each radix 4 SRT division iteration, truncated partial remainder 212 and truncated divisor 322 are used by quotient predictor PLA 230 to generate next quotient 235. Also, positive next quotient 242 and negative next quotient 252 are iteratively merged into the appropriate bits of positive quotient 436 and negative quotient 434, as previously discussed.

After IC iterations of radix 4 SRT division, REM2 is stored in redundant form in partial remainder sum and carry registers 390 and 392, and Q2 is stored in redundant form in negative quotient register 434 and positive quotient register 436. If REM2 is negative, an operation at block 640 generates quotient Q3 equal to Q2 minus 1, and generates remainder REM3 equal to REM2 plus d, where d equals divisor 324. If REM2 is not negative, Q3 is generated equal to Q2, and REM3 is generated equal to REM2 at block 650.

To determine whether REM2 is negative, partial remainder sum and carry portions 76 and 78 are coupled to CPA inputs 462 and 464 by multiplexers 440 and 450 as determined by control signals 441 and 451 issued by control circuit 100. CPA 460 generates combined partial remainder 80, which is transferred into sum register 390 by multiplexer 370 in response to control signals 371 received from control circuit 100. At this point, CPA sign 462, which is received by control circuit 100, indicates whether REM 2 is negative. Control circuit 100 sets a flag indicating whether REM2 is negative. Non redundant REM2 and plus d are stored in the sum 390 and carry 392 latches, respectively.

If REM2 is negative, REM3 is generated by adding the contents of sum and carry registers 390 and 392 using CPA 460. Partial remainder sum and carry portions 76 and 78 are coupled to CPA inputs 462 and 464 by multiplexers 440 and 450 as determined by control signals 441 and 451 issued by control circuit 100. CPA 460 generates combined partial remainder 80, which is transferred into sum register 390 by multiplexer 370. Thus, sum register 390 holds REM3 in non redundant form.

On the other hand, if REM2 is not negative, REM3 is generated by adding the contents of sum register 390 and zero using CPA 460. Partial remainder sum and carry portions 76 and 78 are coupled to CPA inputs 462 and 464 by multiplexers 440 and 450 as determined by control signals 441 and 451 issued by control circuit 100. However, control circuit 100 issues control signals 443, which causes logic circuit 444 to force input 464 of CPA 460 to zero. CPA 460 generates combined partial remainder 80, which is transferred into sum register 390 by multiplexer 370. As before, sum register 390 holds REM3 in non redundant form.

If the least significand bit of K is equal to zero, then block 660 generates the final remainder equal to REM3. Moreover, the final quotient stored in negative quotient register 434 and positive quotient register 436 is combined by CPA 460 into non redundant form. A preselected portion of the final quotient is delivered to processor 20 at block 700.

If the least significand bit of K is equal to one, then another quotient bit is generated using a single bit restoring division step starting at block 670. As before, REM3 is generated in non redundant form using CPA 460. However, REM3 is shifted left one bit by multiplexer 370 before being stored in the sum register 390. The first input of multiplexer 370 is comprised of the lower 69 bits of CPA output 80 (which carries REM3), along with a constant input 372 which is concatenated to the least significant bits of CPA output 80. Control signals 371 received from control circuit 100 cause multiplexer 370 to transfer the first input of multiplexer 370, equivalent to shl1 (REM3) to sum register 390. Also, −1 times the divisor 324 is stored in carry register 392.

Thereafter, CPA 460 is used to subtract divisor 324 (d) from the contents of sum register 390. Divisor 324 times −1 is routed to CPA input 464 through carry register 392 and multiplexer 450. The contents of sum register 390 are routed to CPA input 462 through multiplexer 440. At this point CPA 460 generates REM4=shl1 (REM3) −d.

CPA output 80 is coupled to input 482 of multiplexer 480 through multiplexer 470. It will be appreciated that input 77 carries the lower 68 bits of sum register 390, which holds shl1(REM3). Input 482 carries REM4=shl1(REM3) −d, while input 77 carries shl1(REM3), which is equivalent to REM4+d. Thus, in order to generate the final remainder REM in block 680 or block 690, control circuit 100 issues control signals 484. Control signals 484, along with sign 462 (the sign of REM4) are used by logic 490 to select either REM4 or REM4+d as the final remainder REM.

Finally, at block 700 the final remainder REM, and selected bits of the final quotient are delivered to processor 20 over bus 64. Preselected bits of the final quotient may be useful for implementing periodic functions such as sin and cos. Sign 462, which is the sign of REM4, is tested and used by control circuit 100 to set the final quotient bit.

The present invention has application for use in math processing environments and may be incorporated into a variety of data processing systems. Although the present invention has been described in conjunction with the embodiments illustrated in FIGS. 1 through 6, it is evident that numerous alternatives, modifications, variations and uses will be apparent to those skilled in the art in light of the foregoing description.

What is claimed is:

1. A remainder circuit, comprising:

SRT divider circuit receiving a significand portion of a first data value and a significand portion of a second data value, the SRT divider generating a quotient and a partial remainder by performing a plurality of division cycles according to an SRT division having a radix greater than 2;

correction circuit generating a corrected quotient and a corrected partial remainder by correcting the quotient and the partial remainder if the partial remainder is negative;

restoring divider circuit generating a final quotient and a final remainder by performing a radix 2 restoring division cycle on the corrected quotient and the corrected partial remainder if a number of bits in the final quotient is an odd number.

2. The remainder circuit of claim 1, wherein the SRT division is radix-4 SRT division.

3. The remainder circuit of claim 2, wherein the correction circuit generates the corrected quotient and the corrected partial remainder by adding the significand portion of the second data value to the partial remainder and by subtracting one from the quotient if the partial remainder is negative.

4. The remainder circuit of claim 3, wherein the restoring divider circuit performs at most one cycle of radix 2 restoring division.

5. The remainder circuit of claim 2, wherein the SRT divider circuit comprises:

control circuit receiving an exponent portion of the first data value and an exponent portion of the second data value, the control circuit determining an iteration count for the SRT radix 4 non-restoring division;

quotient predictor circuit generating a first quotient by examining a first predetermined set of bits of the significand portion of the second data value and a second predetermined set of bits of the significand portion of the first data value, the quotient circuit iteratively generating a next quotient according to the iteration count by examining the first predetermined set of bits of the significand portion of the second data value and a third predetermined set of bits of a running partial remainder;

partial remainder circuit receiving the first quotient, the next quotient, the significand portion of the first data value, and the significand portion of the second data value, the partial remainder circuit iteratively generating the running partial remainder according to the iteration count;

quotient circuit generating the quotient equal to the first quotient, and then iteratively shifting the next quotient into the quotient according to the iteration count.

6. The remainder circuit of claim 5, wherein the partial remainder circuit comprises a carry save adder that iteratively generates the running partial remainder in a redundant form comprising a sum portion and a carry portion.

7. The remainder circuit of claim 6, further comprising a carry propagate adder that provides the partial remainder by combining the sum and carry portions of the running partial remainder into a non redundant form.

8. The remainder circuit of claim 5, wherein the quotient circuit generates the quotient in a redundant form comprising a positive quotient and a negative quotient.

9. The remainder circuit of claim 8, further comprising a carry propagate adder that provides the quotient by combining the positive and negative quotient into a non redundant form.

10. The remainder circuit of claim 5, wherein the control circuit determines the iteration count according to the relative magnitudes of the exponent portion of the first data value and the exponent portion of the second data value.

11. In a math processor coupled to receive a first input and a second input each in a floating point form comprising a sign portion, and exponent portion comprising a plurality of bits, and a significand portion comprising a plurality of bits, an apparatus for performing a remainder (REM) function, comprising:

means for generating a difference signal comprising a plurality of bits by subtracting the exponent portion of the second input from the exponent portion of the first input;

control means coupled to receive the difference signal and determine an iteration count for an SRT radix 4 non-restoring division, the control means generating a plurality of control signals according to the iteration count;

quotient predictor means coupled to receive the control signals, the control signals causing the quotient predictor means to generate a first quotient by examining the significand portion of the second input and the significand portion of the first input, the control signals causing the quotient predictor means to iteratively generate a next quotient by examining the significand portion of the second input and a partial remainder;

partial remainder generation means coupled to receive the control signals, the control signals causing the partial remainder generation means to generate the partial remainder equal to the significand portion of the first input minus the first quotient multiplied by the significand portion of the second input, the control signals causing the partial remainder generation means to iteratively generate the partial remainder equal to the significand portion of the first input minus the next quotient multiplied by the partial remainder;

quotient generation means coupled to receive the control signals, the control signals causing the quotient generation means to generate a quotient equal to the first quotient, the control signals causing the quotient generation means to iteratively shift the next quotient into the quotient;

correction means generating a corrected quotient and a corrected partial remainder by correcting the quotient and the partial remainder after the SRT radix 4 non-restoring division if the partial remainder is negative;

divider means generating a final quotient and a final remainder by performing a radix 2 restoring division on the corrected quotient and the corrected partial remainder if a number of bits in the final quotient is an odd number.

12. The apparatus of claim 11, wherein the quotient predictor means comprises:

adder means coupled to receive the partial remainder, the partial remainder having a sum portion and a carry portion, the adder means generating a truncated remainder equal to the arithmetic sum of the sum and carry portions of the partial remainder;

multiplexer means coupled to receive the control signals and selectively couple the truncated remainder, and a predetermined portion of the sum portion of the partial remainder to a multiplexed output;

next quotient logic means coupled to receive the significand portion of the second input and the multiplexed output from the multiplexer means, the next quotient logic means generating the first quotient and the next quotient from the set [−2, −1, 0, 1, 2].

13. The apparatus defined by claim 11, wherein the partial remainder generation means comprises:

first multiplexer means for selectively coupling a sum portion of a last remainder and the first input to a first adder input;

second multiplexer means for selectively coupling a carry portion of the last remainder and a constant zero input to a second adder input;

multiplier means coupled to receive the second input, the first quotient, and the next quotient, the multiplier means generating a third adder input by multiplying the first input by the first quotient and the next quotient;

adder means coupled to receive the first adder input, the second adder input, and the third adder input, the adder means generating the sum and carry portions of the partial remainder by adding the first, second, and third adder inputs;

first register means coupled to receive and store the sum portion of the partial remainder;

second register means coupled to receive and store the carry portion of the partial remainder.

14. The apparatus of claim 13, wherein the adder means comprises a carry save adder.

15. A computer system, comprising:

processor issuing a remainder instruction including a first data value and a second data value each having a floating-point format;

math coprocessor receiving the remainder instruction and executing the remainder instruction, then delivering a final quotient and a final remainder to the processor, the math coprocessor having circuitry for executing the remainder instruction including circuitry for performing a plurality of division cycles according to an SRT division having a radix greater than 2 on the first and second data values to generate a quotient and a partial remainder, the math coprocessor having circuitry for generating a corrected quotient and a corrected partial remainder and circuitry for performing a radix 2 restoring division cycle on the corrected quotient and the corrected partial remainder to generate the final quotient and the final remainder if a number of bits in the final quotient is an odd number.

16. The computer system of claim 15, wherein the math coprocessor comprises:

SRT divider circuit receiving a significand portion of the first data value and a significand portion of the second data value, the SRT divider generating the quotient and the partial remainder by performing the plurality of division cycles according to the SRT division having a radix greater than 2;

correction circuit generating the corrected quotient and the corrected partial remainder by correcting the quotient and the partial remainder if the partial remainder is negative;

restoring divider circuit generating the final quotient and the final remainder by performing the radix 2 restoring division cycle on the corrected quotient and the corrected partial remainder.

17. The computer system of claim 16, wherein the SRT division is radix-4 SRT division.

18. The computer system of claim 17, wherein the correction circuit generates the corrected quotient and the corrected partial remainder by adding the significand portion of the second data value to the partial remainder and by subtracting one from the quotient.

19. The computer system of claim 18, wherein the restoring divider circuit performs at most one cycle of radix 2 restoring division.

20. The computer system of claim 17, wherein the SRT divider circuit comprises:

control circuit receiving an exponent portion of the first data value and an exponent portion of the second data value, the control circuit determining an iteration count for the SRT radix 4 non-restoring division;

quotient predictor circuit generating a first quotient by examining a first predetermined set of bits of the significand portion of the second data value and a second predetermined set of bits of the significand portion of the first data value, the quotient circuit iteratively generating a next quotient according to the iteration count by examining the first predetermined set of bits of the significand portion of the second data value and a third predetermined set of bits of a running partial remainder;

partial remainder circuit receiving the first quotient, the next quotient, the significand portion of the first data value, and the significand portion of the second data value, the partial remainder circuit iteratively generating the running partial remainder according to the iteration count;

quotient circuit generating the quotient equal to the first quotient, and then iteratively shifting the next quotient into the quotient according to the iteration count.

21. The computer system of claim 20, wherein the partial remainder circuit comprises a carry save adder that iteratively generates the running partial remainder in a redundant form comprising a sum portion and a carry portion.

22. The computer system of claim 21, further comprising a carry propagate adder that provides the partial remainder by combining the sum and carry portions of the running partial remainder into a non redundant form.

23. The computer system of claim 20, wherein the quotient circuit generates the quotient in a redundant form comprising a positive quotient and a negative quotient.

24. The computer system of claim 23, further comprising a carry propagate adder that provides the quotient by combining the positive and negative quotient into a non redundant form.

25. The computer system of claim 20, wherein the control circuit determines the iteration count according to the relative magnitudes of the exponent portion of the first data value and the exponent portion of the second data value.

* * * * *